United States Patent
Park et al.

(10) Patent No.: US 8,530,009 B2
(45) Date of Patent: Sep. 10, 2013

(54) LIQUID CRYSTAL DISPLAY DEVICE INCLUDING SIDE SUPPORTING MEANS AND METHOD OF FABRICATING THE SAME

(75) Inventors: Dong-Sik Park, Seoul (KR); Jin-Wuk Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/542,436

(22) Filed: Jul. 5, 2012

(65) Prior Publication Data

US 2013/0021554 A1 Jan. 24, 2013

(30) Foreign Application Priority Data

Jul. 20, 2011 (KR) ........................ 10-2011-0071990

(51) Int. Cl.
*G02F 1/1333* (2006.01)
*G02F 1/1339* (2006.01)

(52) U.S. Cl.
USPC .............................. 428/1.5; 349/58; 349/155

(58) Field of Classification Search
USPC ..................................... 428/1.5; 349/58, 155
See application file for complete search history.

(56) References Cited

U.S. PATENT DOCUMENTS

| | | | |
|---|---|---|---|
| 6,894,082 B2* | 5/2005 | Brantl et al. | 521/50.5 |
| 2003/0128307 A1* | 7/2003 | Ito et al. | 349/58 |
| 2003/0211250 A1* | 11/2003 | Nakamuta et al. | 427/387 |
| 2004/0176485 A1* | 9/2004 | Figovsky et al. | 521/50.5 |
| 2009/0135330 A1* | 5/2009 | Kawase et al. | 349/58 |
| 2009/0147206 A1* | 6/2009 | Lee et al. | 349/154 |
| 2010/0289979 A1* | 11/2010 | Lee | 349/58 |

OTHER PUBLICATIONS

JPO Website Machine English Translation of JP 2010-265440, Shimizu Manabu, Nov. 25, 2010.*
Azodiisobutyronitrile, Chemwatch, Mar. 20, 2013.*

* cited by examiner

*Primary Examiner* — Sophie Hon
(74) *Attorney, Agent, or Firm* — Brinks Hofer Gilson & Lione (57) ABSTRACT

A liquid crystal display device includes: a bottom frame having a horizontal portion and a vertical portion extending from an edge region of the horizontal portion; a backlight unit disposed on the horizontal portion; a liquid crystal panel on the vertical portion and over the backlight unit; a side frame combined with the bottom frame to surround the vertical portion, the side frame having a step portion; and a side supporting means on the step portion, the side supporting means contacting a side surface of the liquid crystal panel to support the liquid crystal panel, wherein the side supporting means includes a light-curable material that expands due to irradiation of a ultraviolet ray.

16 Claims, 4 Drawing Sheets

*(related art)*
FIG. 1

FIG. 2 before UV irradiation       after UV irradiation

*FIG. 3* initiator:Diazoquinone

LIQUID CRYSTAL DISPLAY DEVICE INCLUDING SIDE SUPPORTING MEANS AND METHOD OF FABRICATING THE SAME

This application claims the priority and the benefit under 35 U.S.C. §119(a) on Korean Patent Application No. 10-2011-0071990, filed on Jul. 20, 2011, the entire contents of which are hereby incorporated by reference.

BACKGROUND

1. Field of the Invention

The present disclosure relates to a liquid crystal display device, and more particularly, to a liquid crystal display device having a light weight and a thin profile with various external appearances and a method of fabricating the liquid crystal display device.

2. Discussion of the Related Art

A liquid crystal display (LCD) device that has been widely used for a television or a monitor because of its superiority in displaying a moving image and high contrast ratio produces images by using optical anisotropy and polarization properties of liquid crystal molecules. The LCD device includes a liquid crystal panel that is composed of facing two substrates and a liquid crystal layer between the two substrates. An alignment direction of liquid crystal molecules in the liquid crystal panel is changed by an electric field so that the liquid crystal panel can produce difference in transmittance.

Since the LCD device is a non-emissive type display device, an additional light source is required. Accordingly, a backlight unit including a light source is disposed under the liquid crystal panel. For example, one of a cold cathode fluorescent lamp (CCFL), an external electrode fluorescent lamp (EEFL) and a light emitting diode (LED) may be used as the light source.

Figure 1:
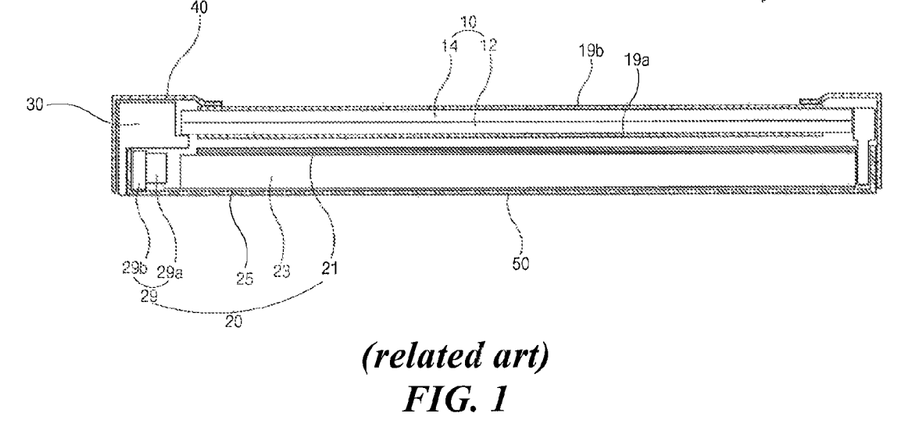
FIG. 1 is a cross-sectional view showing a liquid crystal display device according to the related art.

FIG. 1 is a cross-sectional view showing a liquid crystal display device according to the related art. In FIG. 1, a liquid crystal display (LCD) device 1 includes a liquid crystal panel 10, a backlight unit 20, a main frame 30, a top frame 40 and a bottom frame 50.

The liquid crystal panel 10 displaying an image includes first and second substrates 12 and 14 facing and spaced apart from each other and a liquid crystal layer interposed therebetween. The liquid crystal panel 10 further includes first and second polarizing plates 19a and 19b on outer surfaces of the first and second substrates 12 and 14, respectively. The backlight unit 20 is disposed under the liquid crystal panel 10. The backlight unit 20 includes a light emitting diode (LED) assembly 29, a reflecting plate 25, a light guide plate 23 and a plurality of optical sheets 21. The LED assembly 29 is disposed along at least one side of the main frame 30 and the reflecting plate 25 having a white color or a silver color is disposed over the bottom frame 50. In addition, the light guide plate 23 is disposed over the reflecting plate 25 and the plurality of optical sheets 21 are disposed over the light guide plate 23.

The LED assembly 29 disposed on a side of the light guide plate 23 includes a plurality of LEDs 29a emitting a white-colored light and an LED printed circuit board (PCB) 29b where the plurality of LEDs 29a are formed.

The liquid crystal panel 10 and the backlight unit 20 are integrated by combination of the main frame 30, the top frame 40 and the bottom frame 50. The main frame 30 having a rectangular ring shape surrounds an edge portion of the liquid crystal panel 10 and the backlight unit 20. In addition, the top frame 40 covers a front edge portion of the liquid crystal panel 10 and the bottom frame 50 covers a rear surface of the backlight unit 20. Since the top frame 40 has a bent rectangular ring shape whose cross-section has an "L" shape to cover the front edge portion and the side portion of the liquid crystal panel 10, the liquid crystal panel 10 is exposed through the top frame 40 so that the image of the liquid crystal panel 10 can be displayed.

Recently, the LCD device has been used for a monitor of a desktop computer and a wail-mountable television as well as a portable computer, and the application field of the LCD device has been gradually extended. In addition, the LCD device having an enlarged display area with a reduced weight and a reduced volume has been actively researched. However, since the LCD device includes a lot of elements, there is a limit to the thin profile and the light weight of the LCD device.

In addition, the fabrication cost of the LCD device increases due to the top frame 40. After a metal plate is cut to have a rectangular shape, an open portion of a rectangular shape is formed in the cut metal plate. Next, the cut metal plate is worked through bending and drawing processes to have an "L" shaped cross-section, thereby the top frame 40 obtained. Since the top frame 40 is formed to have an open portion by cutting and removing a portion of the metal plate, a material cost increases.

As a result, an LCD device where a width of bezel is minimized without a top frame has been recently suggested. Since the top frame covering the front edge portion of the liquid crystal panel is omitted, the LCD device includes a side supporting means on a side frame for supporting a side portion of the liquid crystal panel. The side frame including the side supporting means may be formed through a double injection molding. Alternatively, the LCD device includes the side supporting means on the main frame for supporting and protecting the side portion of the liquid crystal panel.

The side supporting means has a rectangular ring shape having an opening and is formed of thermoplastic polyurethane or thermoplastic elastomer. After the side supporting means of thermoplastic polyurethane or thermoplastic elastomer is formed on the side frame or the main frame, the liquid crystal panel is disposed on the main frame. When the side supporting means is formed to have a size of the opening exactly the same as a size of the liquid crystal panel, the liquid crystal panel may be bent while the liquid crystal panel is disposed on the main frame. As a result, the liquid crystal panel may be cracked or edge portions of the liquid crystal panel may be broken due to a bending stress. When the side supporting means is formed to have a size of the opening smaller than a size of the liquid crystal panel, the liquid crystal panel may not be supported by the side supporting means. In addition, as time passes after fabrication of the LCD device, foreign substances may be trapped in a gap between the liquid crystal panel and the side supporting means. As a result, an appearance of the LCD device is deteriorated.

The gap between the liquid crystal panel and the side supporting means may be filled with a material such as silicon by a coating process. However, the gap is not be completely filled due to difference in gap distance according to position so that the foreign substances can be trapped in the gap. Further, fabrication cost of the LCD device increases due to the additional coating process and productivity of the LCD device decreases due to increase in fabrication time.

BRIEF SUMMARY

A liquid crystal display device includes: a bottom frame having a horizontal portion and a vertical portion extending from an edge region of the horizontal portion; a backlight unit disposed on the horizontal portion; a liquid crystal panel on the vertical portion and over the backlight unit; a side frame combined with the bottom frame to surround the vertical portion, the side frame having a step portion; and a side supporting means on the step portion, the side supporting means contacting a side surface of the liquid crystal panel to support the liquid crystal panel, wherein the side supporting means includes a light-curable material that expands due to irradiation of an ultraviolet ray.

In another aspect, a method of fabricating a liquid crystal display device includes: disposing a backlight unit on a horizontal portion of a bottom frame; combining a side frame with bottom frame, the side frame surrounding a vertical portion of the bottom frame; coating a solution of a light-curable material on a step portion of the side frame to form a precursor of a gel state; disposing a liquid crystal panel on the vertical portion, the liquid crystal panel spaced apart from the precursor; and irradiating an ultraviolet ray onto the precursor so that the precursor expands to form a side supporting means, the side supporting means contacting a side surface of the liquid crystal panel to support the liquid crystal panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Reference will now be made in detail to embodiments of the present invention, examples of which are illustrated in the accompanying drawings. Wherever possible, similar reference numbers will be used to refer to the same or similar parts.

Figure 2:
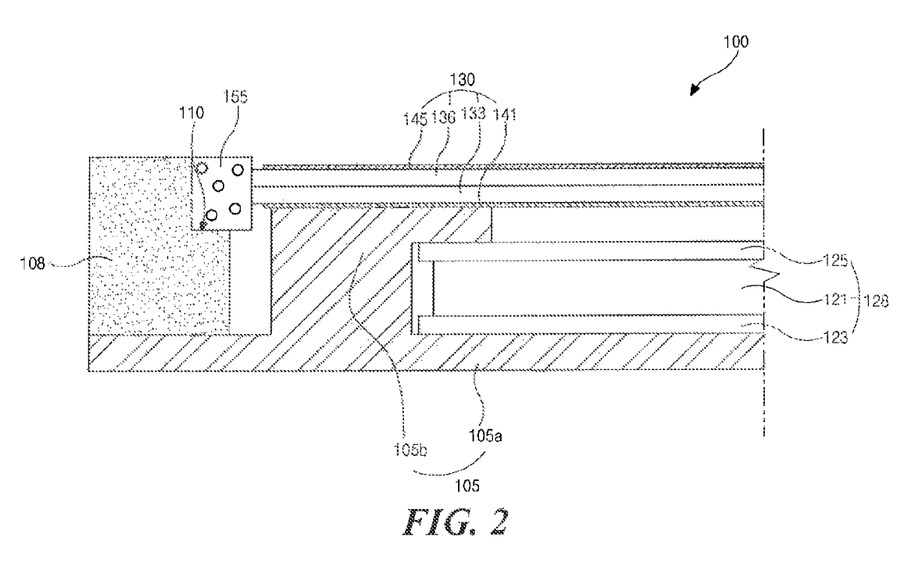
FIG. 2 is a cross-sectional view showing a liquid crystal display device according to an embodiment of the present invention.

FIG. 2 is a cross-sectional view showing a liquid crystal display device according to an embodiment of the present invention.

In FIG. 2, a liquid crystal display (LCD) device 100 includes a liquid crystal panel 130, a backlight unit 128, a bottom frame 105 and a side frame 108. The liquid crystal panel 130 and the backlight unit 128 are surrounded and modularized by the bottom frame 105 and the side frame 108.

The liquid crystal panel 130 displaying an image includes first and second substrates 133 and 136 facing and spaced apart from each other and a liquid crystal layer (not shown) interposed therebetween. Although not shown, when the liquid crystal panel 130 has an active matrix type, a gate line, a data line, a thin film transistor (TFT) and a pixel electrode are formed on an inner surface of the first substrate 133 referred to as a lower substrate or an array substrate and a color filter layer, and a black matrix and a common electrode are formed on an inner surface of the second substrate 136 referred to as an upper substrate or a color filter substrate. The gate line and the data line cross each other to define a pixel region and the TFT is connected to the gate line and the data line. In addition, the pixel electrode is connected to the TFT.

The color filter layer includes red, green and blue color filters each corresponding to the pixel region, and the black matrix covers the gate line, the data line and the TFT. Further, the common electrode is formed on the color filter layer and the black matrix. Moreover, first and second polarizing plates 141 and 145 where a predetermined polarized light selectively passes may be formed on outer surfaces of the first and second substrates 133 and 136, respectively.

A printed circuit board (PCB) (not shown) is connected to at least one side of the liquid crystal panel 130 through a connecting means (not shown) such as a flexible circuit board (FPC) or a tape carrier package (TCP). The PCB may be bent toward a side surface or a rear surface of the bottom frame 105 during modularization process.

When the TFT connected to the gate line is turned on by a gate signal of a gate driving circuit, a data signal of a data driving circuit is applied to the pixel electrode through the data line and an alignment direction of liquid crystal molecules of the liquid crystal layer is changed by an electric field generated between the pixel electrode and the common electrode. As a result, the liquid crystal panel 130 produces transmittance difference and displays images.

The backlight unit 128 supplying a light to the liquid crystal panel 130 is disposed under the liquid crystal panel 130. The backlight unit 128 includes a light emitting diode (LED) assembly (not shown) as a light source, a reflecting plate 123, a light guide plate 121 and a plurality of optical sheets 125. The LED assembly is disposed along at least one side of the light guide plate 121 and the reflecting plate 123 having a white color or a silver color is disposed over the bottom frame 105. In addition, the light guide plate 121 is disposed over the reflecting plate 123 and the plurality of optical sheets 125 are disposed over the light guide plate 121.

Although not shown, the LED assembly may include a plurality of LEDs and an LED printed circuit board (PCB) where the plurality of LEDs are separately disposed. Each of the plurality of LEDs may include an LED chip emitting red-colored, green-colored and blue-colored lights or a white-colored light and emit a white-colored light to an incident surface of the light guide plate 121. Alternatively, the plurality of LEDs may include a plurality of red LEDs, a plurality of green LEDs and a plurality of blue LEDs and emit a white-colored light by turning on the red, green and blue LEDs at the same time.

Although the LED assembly is used as a light source in FIG. 2, one of a cold cathode fluorescent lamp (CCFL) and an external electrode fluorescent lamp (EEFL) may be used as a light source in another embodiment.

The light emitted from the plurality of LEDs enters the light guide plate 121 and is uniformly diffused in the whole light guide plate 121 by total reflection so that a planar light can be supplied to the liquid crystal panel 130. For the purpose of supplying a uniform planar light, the light guide plate 121 may include a uniformity pattern on a rear surface thereof. For example, one of an elliptical pattern, a polygonal pattern and a hologram pattern may be formed on the rear surface of the light guide plate 121 as a uniformity pattern to guide the light entering the light guide plate 121 and the uniformity pattern may be formed by a printing method or an injecting method.

The reflecting plate 123 under the rear surface of the light guide plate 121 reflects the light penetrating the rear surface of the light guide plate 121 toward the liquid crystal panel 130 to improve brightness and efficiency of the light. The plurality of optical sheets 125 over the light guide plate 121 may include a diffusing sheet and at least one collimating sheet. The plurality of optical sheets 125 may diffuse or collimate the light having passed through the light guide plate 121 to improve uniformity of the planar light.

The liquid crystal panel 130 and the backlight unit 128 are modularized and integrated by the bottom frame 105 and the side frame 108. The bottom frame 105 includes a horizontal portion 105a contacting a rear surface of the backlight unit 128 and a vertical portion 105b vertically extending from an edge region of the horizontal portion 105a and contacting a side surface of the backlight unit 128. The side frame 108 having a rectangular ring shape is disposed on the edge region of the horizontal portion 105a. The side frame 108 surrounds side surfaces of the liquid crystal panel 130 and the backlight unit 128 and is combined with the bottom frame 105.

The side frame 108 includes a step portion 110 on an inner surface thereof to have an "L" shaped cross-section. A side supporting means 155 is formed on the step portion 110 to contact side and bottom surface of the step portion 110. The side supporting means 155 is formed of a light-curable material. For example, the light-curable material may expand and be hardened by irradiation of an ultraviolet (UV) ray.

The liquid crystal panel 130 and the backlight unit 128 are modularized by the bottom frame 105 and the side frame 108 to constitute the LCD device 100. Since a main frame and a top frame according to the related art are omitted, the LCD device 100 has a light weight and a thin profile with a narrow bezel. In addition, fabrication process of the LCD device is simplified and the modularization process is more easily performed. Further, since the side supporting means 155 contacts a side surface of the liquid crystal panel 130, generation of a gap between the liquid crystal panel 130 and the side supporting means 155 is prevented. As a result, deterioration in appearance of the LCD device 100 due to the foreign substances is prevented.

Figure 3:
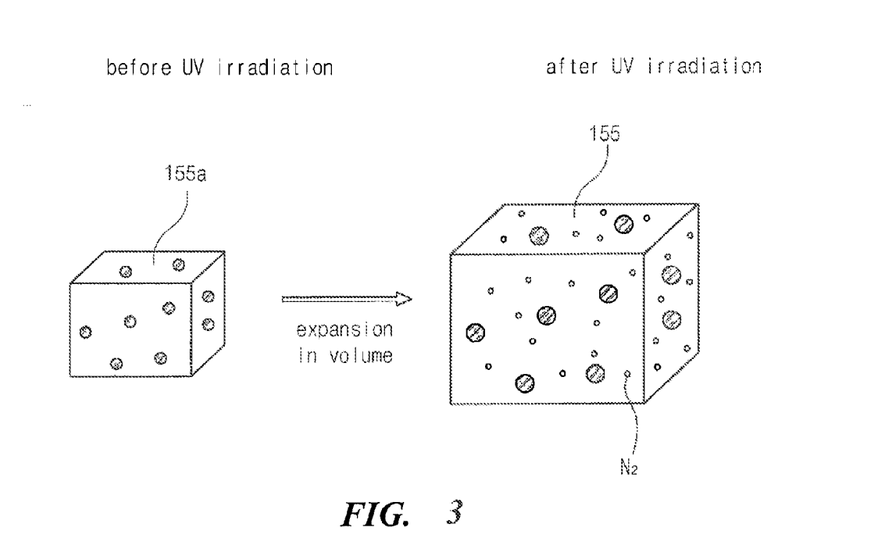
FIG. 3 is a view showing a characteristic of a side supporting means of a light-curable material according to an embodiment of the present invention.

FIG. 3 is a view showing a characteristic of a side supporting means of a light-curable material according to an embodiment of the present invention. For convenience, a portion of a side supporting means is shown in FIG. 3.

In FIG. 3, a precursor 155a is formed on a step portion 110 (of FIG. 2) and a side supporting means 155 is formed by irradiating an ultraviolet (UV) ray onto a precursor 155a once. The precursor 155a having a gel state may be formed by coating a light-curable material of a solution state. The precursor 155a of a gel state expands and is hardened by irradiation of the UV ray. For example, the precursor 155a may have a first volume and the side supporting means 155 may have a second volume greater than the first volume. A nitrogen gas ($N_2$) is generated in the precursor 155a of a gel state by irradiation of the UV ray and the precursor 155a of the first volume expands due to the nitrogen gas ($N_2$) to become the side supporting means 155 of the second volume. After a solvent in the side supporting means 155 is evaporated, the side supporting means 155 is completely hardened to have a solid state. After the side supporting means 155 of a solid state is formed by irradiation of the UV ray, the volume of the side supporting means 155 is not changed even when an additional UV ray is irradiated onto or a heat is added to the side supporting means 155.

The light-curable material for the side supporting means 155 includes an acrylic copolymer resin, an acrylic monomer, a crosslinking monomer, an initiator and a silane coupling agent. For example, the light-curable material for the side supporting means 155 may include about 98% to about 99.5% by weight of an acrylic copolymer resin, an acrylic monomer and a crosslinking monomer, where the acrylic copolymer resin, the acrylic monomer and the crosslinking monomer have a weight ratio within a range of 14:3:3 to 6:2:2, and about 0.5% to about 2% by weight of an initiator and a silane coupling agent, where the initiator and the silane coupling agent have a weight ratio within a range of 6:4 to 5:5. For example, the light-curable material of the side supporting means 155 may include about 58.8% to about 69.7% by weight of an acrylic copolymer resin, about 14.7% to about 19.9% by weight of an acrylic monomer, about 14.7% to about 19.9% by weight of a crosslinking monomer, about 0.3% to about 1.2% by weight of an initiator and about 0.2% to about 1% by weight of a silane coupling agent.

The acrylic copolymer resin influences visibility and hardening degree of the side supporting means 155 and has a weight-average molecular weight (Mw) converted to polystyrene of about 2000 to about 6000. For example, the acrylic copolymer resin may include at least one of epoxy acrylate resin, urethane acrylate resin, polyester acrylate resin, silicon acrylate resin, amino acrylate resin, epoxy methacrylate resin, urethane methacrylate resin, polyester methacrylate resin, silicon methacrylate resin and amino methacrylate resin.

The acrylic monomer influences visibility and coating degree of the side supporting means 155. For example, the acrylic monomer may include at least one of 2-butoxyethyl acrylate, 2-butoxyethyl methacrylate, 2-ethoxyethyl acrylate, 2-ethoxyethyl methacrylate, 2-ethyl-2-adamantyl acrylate, 2-ethyl-2-adamantyl methacrylate, 2-hydroxyethyl acrylate, 2-methyl-2-adamantyl acrylate, 2-methyl-2-adamantyl methacrylate, benzyl acrylate, cyclohexyl acrylate, di(ethylene glycol) ethyl ether acrylate, di(ethylene glycol) ethyl ether methacrylate, di(ethylene glycol) methyl ether methacrylate, dicyclopentanyl acrylate, epoxy acrylate, ethylene glycol methyl ether acrylate, ethylene glycol phenyl ether acrylate, hydroxypropyl acrylate, isobornyl acrylate, methyl adamentyl acrylate, neopentyl glycol benzonate acrylate, 2-hydroxyethyl methacrylate, adamantyl methacrylate, allyl methacrylate, benzyl methacrylate, cyclohexyl methacrylate, dicyclopentanyl methacrylate, epoxy cyclohexyl methyl methacrylate, ethylene glycol phenyl ether methacrylate, hydroxybutyl methacrylate, hydroxypropyl methacrylate, isobornyl methacrylate, glycidyl methacrylate, methyl adamantyl methacrylate, methyl methacrylate and methyl glycidyl methacrylate; a first acrylate group including isobutyl acrylate, tert-butyl acrylate, lauryl acrylate, alkyl acrylate, 2-hydroxy acrylate, trimethoxybutyl acrylate, ethyl carbitol acrylate, phenoxyethyl acrylate, 4-hydroxybutyl acrylate and 2-hydroxy-3-phenoxypropyl acrylate and a first methacrylate group corresponding to the first acrylate group; a second acrylate group including 3-fluoroethyl acrylate and 4-fluoropropyl acrylate and a second methacrylate group corresponding to the second acrylate group; and a third acrylate group including triethyl siloxyl ethyl acrylate and a third methacrylate group corresponding to the third acrylate group.

The crosslinking monomer influences visibility and hardening degree of the side supporting means 155. For example, the crosslinking monomer may include at least one of a fourth acrylate group including 1,4-butanediol diacrylate, 1,6-hexanediol diacrylate, 1,3-butylene glycol diacrylate, neopentyl glycol diacrylate, ethylene glycol diacrylate, diethylene glycol diacrylate, propylene glycol diacrylate, pentaerythritol tetraacrylate, pentaerythritol diacrylate, pentaerythritol triacrylate, dipentaerythritol triacrylate, dipentaerythritol pentaacrylate, pentaerythritol hexaacrylate, triethylene glycol diacrylate, polyethylene glycol diacrylate, dipentaerythritol diacrylate, sorbitol triacrylate, bisphenol A diacrylate derivative and trimethylol propane triacrylate and a fourth methacrylate group corresponding to the fourth acrylate group.

Figure 4:
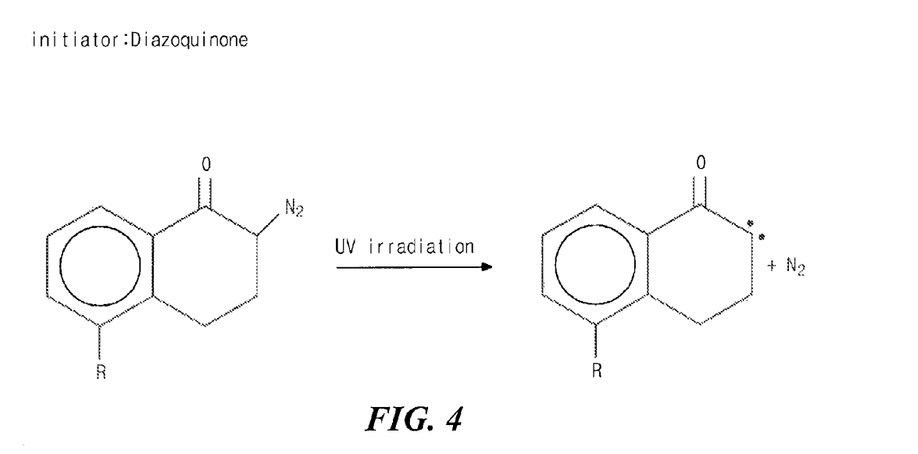
FIG. 4 is a view showing a characteristic of an initiator of a side light-curable material for a supporting means according to an embodiment of the present invention.

FIG. 4 is a view showing a characteristic of an initiator of a side light-curable material for a supporting means according to an embodiment of the present invention.

In FIG. 4, the initiator may include one of a diazoquinone (DQ) group or mixture of at least two of a DQ group. A DQ material of a DQ group includes a nitrogen molecule ($N_2$). When an UV ray is irradiated onto the side supporting means 155 of a light-curable material including the DQ material as an initiator, the nitrogen molecule ($N_2$) is separated as a gas state from the DQ material an the light-curable material expands without an additional foaming gas. Accordingly, the initiator of a DQ material contributes to expansion of the light-curable material by providing a nitrogen gas. In addition, the initiator derives hardening of the light-curable material by connecting the acrylic copolymer resin, the acrylic monomer and the crosslinking monomer.

Referring again to FIG. 3, the silane coupling agent of the light-curable material improves adhesion force between the side supporting means 155 and the side frame 108 (of FIG. 2). For example, the silane coupling agent may include one of an epoxy group including 2-(3,4epoxycyclohexyl)ethyl trimethoxysilane, 3-glycidoxy trimethoxysilane and 3-glycidoxy propyl trimethoxysilane; an amine group including N-2 (aminoethyl)3-aminopropyl methyl dimethoxysilane, N-2 (aminoethyl)3-aminopropyl trimethoxysilane, N-2 (aminoethyl)3-aminopropyl triethoxysilane, 3-aminopropyl trimethoxysilane, 3-aminopropyl triethoxysilane, 3-triethoxysily-N-(1,3-dimethylbutylidene)propylamine and N-phenyl-3-aminopropyl trimethoxysilane; a mercapto group including 3-mercaptopropyl methyl dimethoxysilane and 3-mercaptopropyl triethoxysilane; and an isocyanate group including 3-isocyanatepropyl triethoxysilane.

The light-curable material of the side supporting means 155 may include an acrylic copolymer resin, an acrylic monomer, a crosslinking monomer, an initiator and a silane coupling agent in a solvent. For example, the solvent may have an alcohol-dispersed system. The light-curable material of the side supporting means 155 may further include an additive. For example, the additive may include a pigment having a color such as black.

After the solution of the light-curable material that includes the acrylic copolymer resin, the acrylic monomer, the crosslinking monomer, the initiator and the silane coupling agent in the solvent is coated on the step portion 110 to form the precursor 155a, the UV ray is irradiated onto the precursor 155a and the precursor 155a expands by irradiation of the UV ray. Subsequently, the solvent is evaporated and eliminated to form the side supporting means 155 that is completely hardened. As a result, the modularization process where the liquid crystal panel 130 (of FIG. 2) is disposed on the vertical portion 105b (of FIG. 2) of the bottom frame 105 (of FIG. 2) is performed without bending of the liquid crystal panel 130. Accordingly, damages such as break or crack of the liquid crystal panel 130 are prevented. In addition, fabrication cost decreases and productivity is improved.

Figure 5A:
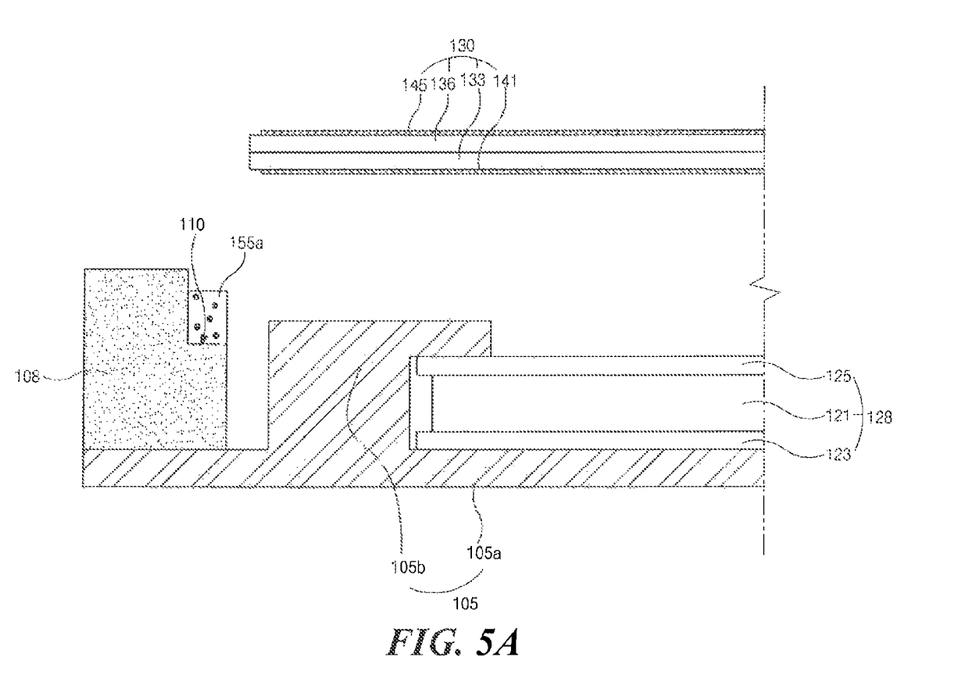
FIGS. 5A to 5C are cross-sectional views showing a method of fabricating a liquid crystal display device according to an embodiment of the present invention.
Figure 5B:
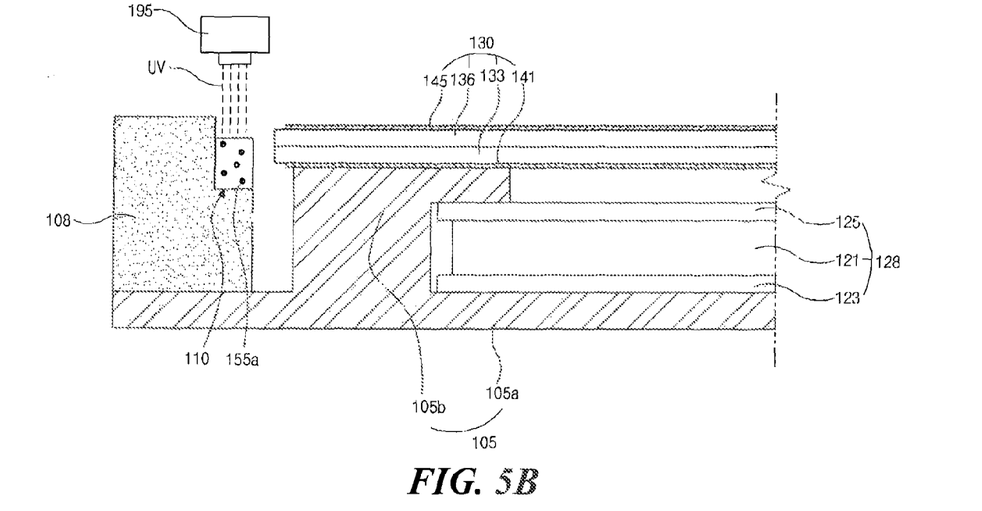
Figure 5C:
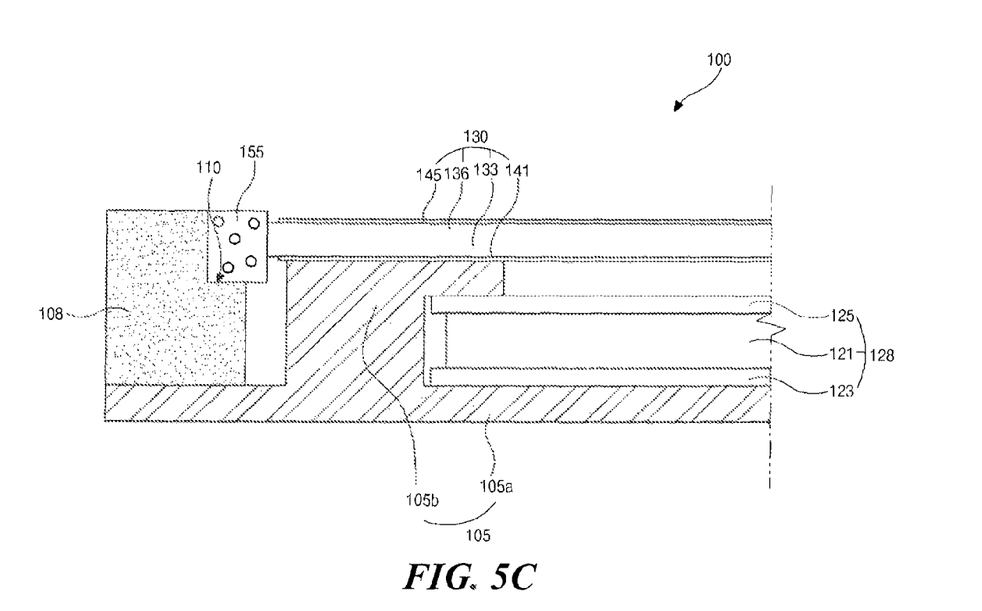

FIGS. 5A to 5C are cross-sectional views showing a method of fabricating a liquid crystal display device according to an embodiment of the present invention.

In FIG. 5A, after first and second substrates 133 and 136 are attached and a liquid crystal layer (not shown) is interposed between the first and second substrates 133 and 136, first and second polarizing plates 141 and 145 are formed on outer surfaces of the first and second substrates 133 and 136, respectively, to form a liquid crystal panel 130.

Next, a printed circuit board (PCB) (not shown) is connected to the liquid crystal panel 130 through a connecting means (not shown) such as a flexible circuit board (FPC) or a tape carrier package (TCP). Next, a backlight unit 128 is disposed on a horizontal portion 105a of a bottom frame 105, a side frame 108 is assembled with the bottom frame 105 to surround a side surface of a vertical portion 105b of the bottom frame 105.

Next, a solution of a light-curable material that includes an acrylic copolymer resin, an acrylic monomer, a crosslinking monomer, an initiator and a silane coupling agent in a solvent is coated on a step portion 110 of the side frame 108 to form a precursor 155a of a gel state having a rectangular ring shape.

In FIG. 5B, the liquid crystal panel 130 is disposed on the vertical portion 105b of the bottom frame 105. Here, a size of an opening of the precursor 155a is greater than a size of the liquid crystal panel 130 so that the precursor 155a can be spaced apart from the liquid crystal panel 130. For example, the precursor 1551 may be spaced apart from a side surface of the liquid crystal panel by a gap distance within a range of about 0.1 mm to about 0.5 mm.

Since the precursor 155a is spaced apart from the liquid crystal panel 130, the liquid crystal panel 130 is disposed on the bottom frame 105 without bending. As a result, damages such as break or crack of the liquid crystal panel 130 due to bending stress are prevented. In addition, since the liquid crystal panel 130 is disposed on the bottom frame 105 without contact with the precursor 155a, performance of modularization process is improved.

Next, a UV ray of an irradiation apparatus 195 is irradiated onto the precursor 155a on the side frame 108. Although the UV ray is selectively irradiated onto precursor 155a by scanning, the UV ray may be selectively irradiated onto the whole precursor 155a using a mask in another embodiment. Alternatively, the UV ray may be irradiated onto the whole area including the liquid crystal panel 130, the precursor 155a and the side frame 108 in another embodiment.

In FIG. 5O, the acrylic copolymer resin, the acrylic monomer and the crosslinking monomer of the light-curable material of the precursor 155a are combined with each other by crosslinking due to the initiator and a nitrogen gas ($N_2$) is separated from the precursor 155a, thereby the precursor 155a expanding. Since the precursor 155a is formed to be separated from the liquid crystal panel 130 based on volume expansion of the precursor 155a, the precursor 155a stops expanding when the precursor 155a contacts the side surface of the liquid crystal panel 130. Next, the solvent of the precursor 155a is evaporated and eliminated to form a side supporting means 155 that is completely hardened and contacts the side surface of the liquid crystal panel 130, thereby a liquid crystal display (LCD) device 100 obtained. As a result, the liquid crystal panel 130 is fixed by the side supporting means 155.

Since the side supporting means 155 contacts the side surface of the liquid crystal panel 130 without a gap, foreign substances is not trapped between the side frame 108 and the liquid crystal panel 130 and deterioration in appearance of the LCD device 100 due to the foreign substances is prevented. In addition, when the light-curable material further includes an additive such as a black pigment, the side supporting means 155 has a black color. Since the side supporting means 155 has the same color as the black color of the liquid crystal panel 130 in an OFF state, the appearance and the black visibility of the LCD device 100 are improved.

Consequently, in a liquid crystal display device according to the present invention, a light-curable material that expands due to irradiation of an UV ray is used for a side supporting means without provision of an additional foaming gas. Accordingly, damages such as break or crack of a liquid crystal panel during modularization process are prevented by using. In addition, the side supporting means stably supports the liquid crystal panel and contacts the liquid crystal panel without a gap. Accordingly, deterioration in appearance due to foreign substances is prevented even as time passes after fabrication. Further, when the liquid crystal panel is disposed on a bottom frame, a precursor of the side supporting means is spaced apart from the liquid crystal panel. Accordingly, the liquid crystal display device is stably and easily modularized. Moreover, the side supporting means is hardened by evaporation of the solvent without an additional curing step. Accordingly, fabrication cost is reduced by omitting a curing apparatus and deterioration of a liquid crystal layer such as phase transition due to a curing step is prevented.

It will be apparent to those skilled in the art that various modifications and variations can be made in the present disclosure without departing from the spirit or scope of the invention. Thus, it is intended that the present invention cover the modifications and variations of this invention provided they come within the scope of the appended claims and their equivalents.

The invention claimed is:

1. A liquid crystal display device, comprising:
   a bottom frame having a horizontal portion and a vertical portion extending from an edge region of the horizontal portion;
   a backlight unit disposed on the horizontal portion;
   a liquid crystal panel on the vertical portion and over the backlight unit;
   a side frame combined with the bottom frame to surround the vertical portion, the side frame having a step portion; and
   a side supporting means on the step portion, the side supporting means contacting a side surface of the liquid crystal panel to support the liquid crystal panel,
   wherein the side supporting means includes a light-curable material that expands due to generation of nitrogen gas by irradiation of an ultraviolet ray,
   wherein the light-curable material includes an acrylic copolymer resin, an acrylic monomer, a crosslinking monomer, an initiator for photopolymerization and expansion and a silane coupling agent, and
   wherein the initiator includes a diazoquinone (DQ) material.

2. The device according to claim 1, wherein the acrylic copolymer resin has a weight-average molecular weight (Mw) converted to polystyrene of about 2000 to about 6000, and
   wherein the acrylic copolymer resin includes at least one of epoxy acrylate resin, urethane acrylate resin, polyester acrylate resin, silicon acrylate resin, amino acrylate resin, epoxy methacrylate resin, urethane methacrylate resin, polyester methacrylate resin, silicon methacrylate resin and amino methacrylate resin.

3. The device according to claim 1, wherein the acrylic monomer includes at least one of 2-butoxyethyl acrylate, 2-butoxyethyl methacrylate, 2-ethoxyethyl acrylate, 2-ethoxyethyl methacrylate, 2-ethyl-2-adamantyl acrylate, 2-ethyl-2-adamantyl methacrylate, 2-hydroxyethyl acrylate, 2-methyl-2-adamantyl acrylate, 2-methyl-2-adamantyl methacrylate, benzyl acrylate, cyclohexyl acrylate, di(ethylene glycol) ethyl ether acrylate, di(ethylene glycol) ethyl ether methacrylate, di(ethylene glycol) methyl ether methacrylate, dicyclopentanyl acrylate, epoxy acrylate, ethylene glycol methyl ether acrylate, ethylene glycol phenyl ether acrylate, hydroxypropyl acrylate, isobornyl acrylate, methyl adamentyl acrylate, neopentyl glycol benzonate acrylate, 2-hydroxyethyl methacrylate, adamantyl methacrylate, allyl methacrylate, benzyl methacrylate, cyclohexyl methacrylate, dicyclopentanyl methacrylate, epoxy cyclohexyl methyl methacrylate, ethylene glycol phenyl ether methacrylate, hydroxybutyl methacrylate, hydroxypropyl methacrylate, isobornyl methacrylate, glycidyl methacrylate, methyl adamantyl methacrylate, methyl methacrylate and methyl glycidyl methacrylate; a first acrylate group including isobutyl acrylate, tert-butyl acrylate, lauryl acrylate, alkyl acrylate, 2-hydroxy acrylate, trimethoxybutyl acrylate, ethyl carbitol acrylate, phenoxyethyl acrylate, 4-hydroxybutyl acrylate and 2-hydroxy-3-phenoxypropyl acrylate and a first methacrylate group corresponding to the first acrylate group; a second acrylate group including 3-fluoroethyl acrylate and 4-fluoropropyl acrylate and a second methacrylate group corresponding to the second acrylate group; and a third acrylate group including triethyl siloxyl ethyl acrylate and a third methacrylate group corresponding to the third acrylate group.

4. The device according to claim 1, wherein the crosslinking monomer includes at least one of a fourth acrylate group including 1,4-butanediol diacrylate, 1,6-hexanediol diacrylate, 1,3-butylene glycol diacrylate, neopentyl glycol diacrylate, ethylene glycol diacrylate, diethylene glycol diacrylate, propylene glycol diacrylate, pentaerythritol tetraacrylate, pentaerythritol diacrylate, pentaerythritol triacrylate, dipentaerythritol triacrylate, dipentaerythritol pentaacrylate, pentaerythritol hexaacrylate, triethylene glycol diacrylate, polyethylene glycol diacrylate, dipentaerythritol diacrylate, sorbitol triacrylate, bisphenol A diacrylate derivative and trimethylol propane triacrylate and a fourth methacrylate group corresponding to the fourth acrylate group.

5. The device according to claim 1, wherein the silane coupling agent includes one of an epoxy group including 2-(3,4epoxycyclohexyl)ethyl trimethoxysilane, 3-glycidoxy trimethoxysilane and 3-glycidoxy propyl trimethoxysilane; an amine group including N-2(aminoethyl)-3-aminopropyl methyl dimethoxysilane, N-2(aminoethyl)-3-aminopropyl trimethoxysilane, N-2(aminoethyl)-3-aminopropyl triethoxysilane, 3-aminopropyl trimethoxysilane, 3-aminopropyl triethoxysilane, 3-triethoxysily-N-(1,3-dimethylbutylidene) propylamine and N-phenyl-3-aminopropyl trimethoxysilane; a mercapto group including 3-mercaptopropyl methyl dimethoxysilane and 3-mercaptopropyl triethoxysilane; and an isocyanate group including 3-isocyanatepropyl triethoxysilane.

6. The device according to claim 1, wherein the light-curable material includes about 98% to about 99.5% by weight of the acrylic copolymer resin, the acrylic monomer and the crosslinking monomer and about 0.5% to about 2% by weight of the initiator and the silane coupling agent, wherein the acrylic copolymer resin, the acrylic monomer and the crosslinking monomer have a weight ratio within a range of 14:3:3 to 6:2:2, and wherein the initiator and the silane coupling agent have a weight ratio within a range of 6:4 to 5:5.

7. The device according to claim 1, wherein the light-curable material further includes an additive having a pigment.

8. The device according to claim 1, wherein the backlight unit includes a reflecting plate over the bottom frame, a light guide plate over the reflecting plate, a plurality of optical sheets over the light guide plate and a light source adjacent to at least one side of the light guide plate.

9. A method of fabricating a liquid crystal display device, comprising: disposing a backlight unit on a horizontal portion of a bottom frame; combining a side frame with the bottom frame, the side frame surrounding a vertical portion of the bottom frame; coating a solution of a light-curable material on a step portion of the side frame to form a precursor of a gel state; disposing a liquid crystal panel on the vertical portion, the liquid crystal panel spaced apart from the precursor; and irradiating an ultraviolet ray onto the precursor so that the precursor expands to form a side supporting means, the side supporting means contacting a side surface of the liquid crystal panel to support the liquid crystal panel, wherein the solution of the light-curable material includes an acrylic copolymer resin, an acrylic monomer, a crosslinking monomer, an initiator for photopolymerization and expansion, and a silane coupling agent in a solvent, and wherein the initiator includes a diazoquinone (DQ) material.

10. The method according to claim 9, wherein the acrylic copolymer resin has a weight-average molecular weight (Mw) converted to polystyrene of about 2000 to about 6000, and
wherein the acrylic copolymer resin includes at least one of epoxy acrylate resin, urethane acrylate resin, polyester acrylate resin, silicon acrylate resin, amino acrylate resin, epoxy methacrylate resin, urethane methacrylate resin, polyester methacrylate resin, silicon methacrylate resin and amino methacrylate resin.

11. The method according to claim 9, wherein the acrylic monomer includes at least one of 2-butoxyethyl acrylate, 2-butoxyethyl methacrylate, 2-ethoxyethyl acrylate, 2-ethoxyethyl methacrylate, 2-ethyl-2-adamantyl acrylate, 2-ethyl-2-adamantyl methacrylate, 2-hydroxyethyl acrylate, 2-methyl-2-adamantyl acrylate, 2-methyl-2-adamantyl methacrylate, benzyl acrylate, cyclohexyl acrylate, di(ethylene glycol) ethyl ether acrylate, di(ethylene glycol) ethyl ether methacrylate, di(ethylene glycol) methyl ether methacrylate, dicyclopentanyl acrylate, epoxy acrylate, ethylene glycol methyl ether acrylate, ethylene glycol phenyl ether acrylate, hydroxypropyl acrylate, isobornyl acrylate, methyl adamentyl acrylate, neopentyl glycol benzonate acrylate, 2-hydroxyethyl methacrylate, adamantyl methacrylate, allyl methacrylate, benzyl methacrylate, cyclohexyl methacrylate, dicyclopentanyl methacrylate, epoxy cyclohexyl methyl methacrylate, ethylene glycol phenyl ether methacrylate, hydroxybutyl methacrylate, hydroxypropyl methacrylate, isobornyl methacrylate, glycidyl methacrylate, methyl adamantyl methacrylate, methyl methacrylate and methyl glycidyl methacrylate; a first acrylate group including isobutyl acrylate, tert-butyl acrylate, lauryl acrylate, alkyl acrylate, 2-hydroxy acrylate, trimethoxybutyl acrylate, ethyl carbitol acrylate, phenoxyethyl acrylate, 4-hydroxybutyl acrylate and 2-hydroxy-3-phenoxypropyl acrylate and a first methacrylate group corresponding to the first acrylate group; a second acrylate group including 3-fluoroethyl acrylate and 4-fluoropropyl acrylate and a second methacrylate group corresponding to the second acrylate group; and a third acrylate group including triethyl siloxyl ethyl acrylate and a third methacrylate group corresponding to the third acrylate group.

12. The method according to claim 9, wherein the crosslinking monomer includes at least one of a fourth acrylate group including 1,4-butanediol diacrylate, 1,6-hexanediol diacrylate, 1,3-butylene glycol diacrylate, neopentyl glycol diacrylate, ethylene glycol diacrylate, diethylene glycol diacrylate, propylene glycol diacrylate, pentaerythritol tetraacrylate, pentaerythritol diacrylate, pentaerythritol triacrylate, dipentaerythritol triacrylate, dipentaerythritol pentaacrylate, pentaerythritol hexaacrylate, triethylene glycol diacrylate, polyethylene glycol diacrylate, dipentaerythritol diacrylate, sorbitol triacrylate, bisphenol A diacrylate derivative and trimethylol propane triacrylate and a fourth methacrylate group corresponding to the fourth acrylate group.

13. The method according to claim 9, wherein the silane coupling agent includes one of an epoxy group including 2-(3,4epoxycyclohexyl)ethyl trimethoxysilane, 3-glycidoxy trimethoxysilane and 3-glycidoxy propyl trimethoxysilane; an amine group including N-2(aminoethyl)-3-aminopropyl methyl dimethoxysilane, N-2(aminoethyl)-3-aminopropyl trimethoxysilane, N-2(aminoethyl)-3-aminopropyl triethoxysilane, 3-aminopropyl trimethoxysilane, 3-aminopropyl triethoxysilane, 3-triethoxysily-N-(1,3-dimethylbutylidene) propylamine and N-phenyl-3-aminopropyl trimethoxysilane; a mercapto group including 3-mercaptopropyl methyl dimethoxysilane and 3-mercaptopropyl triethoxysilane; and an isocyanate group including 3-isocyanatepropyl triethoxysilane.

14. The method according to claim 9, wherein the light-curable material includes about 98% to about 99.5% by weight of the acrylic copolymer resin, the acrylic monomer and the crosslinking monomer and about 0.5% to about 2% by weight of the initiator and the silane coupling agent, wherein the acrylic copolymer resin, the acrylic monomer and the crosslinking monomer have a weight ratio within a range of 14:3:3 to 6:2:2, and wherein the initiator and the silane coupling agent have a weight ratio within a range of 6:4 to 5:5.

15. The method according to claim 9, wherein the solvent has an alcohol-dispersed system.

16. The method according to claim 9, wherein the light-curable material further includes an additive having a pigment.

* * * * *